G. McELROY.
MEAT CUTTER.
APPLICATION FILED JULY 29, 1920.
1,363,741.
Patented Dec. 28, 1920.
4 SHEETS—SHEET 1.
FIG. I.
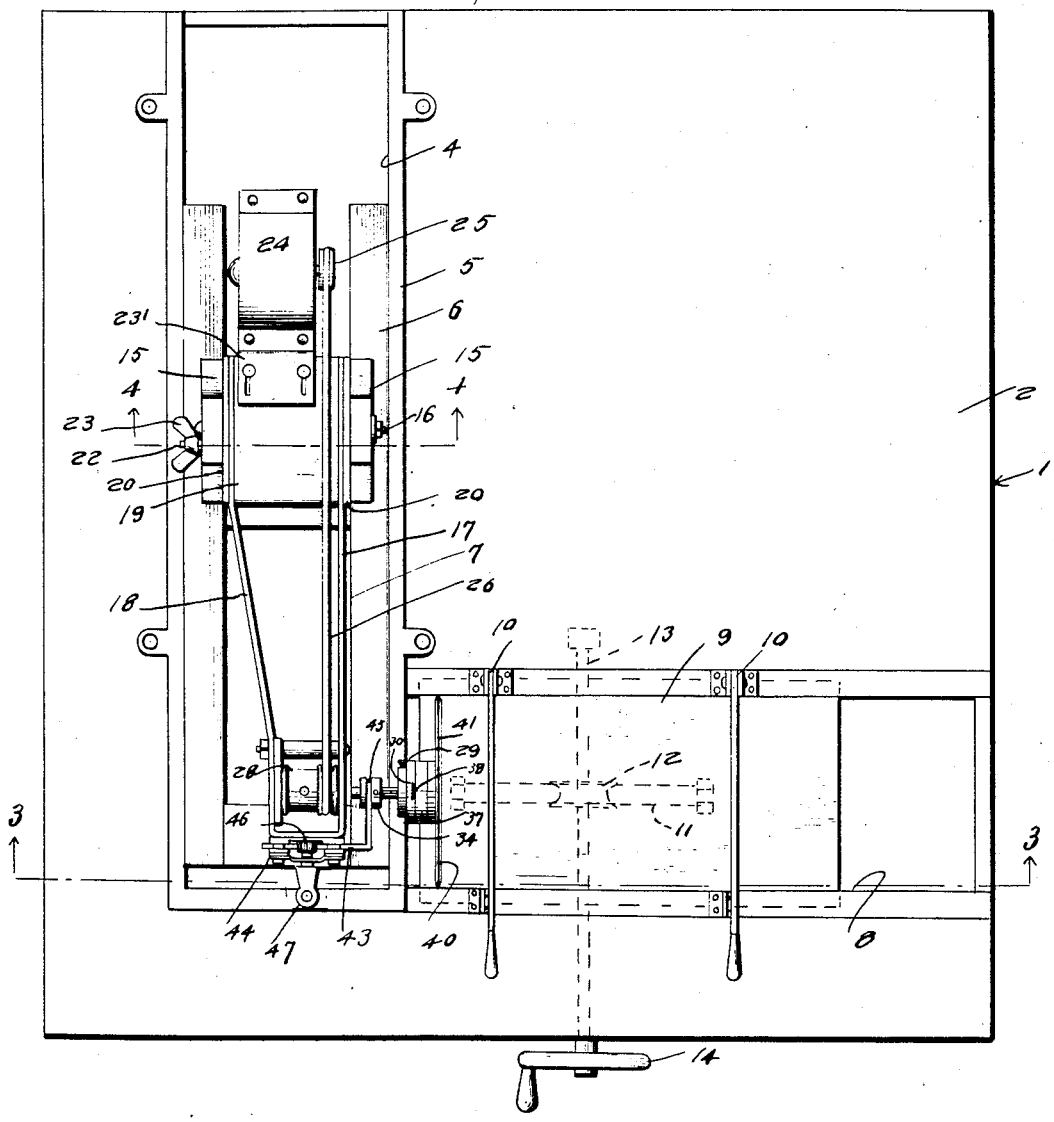
FIG. IB.
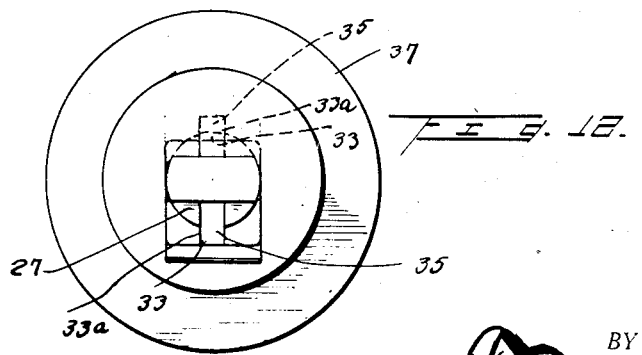
INVENTOR.
G. McElroy.
BY
ATTORNEY.

G. McELROY.
MEAT CUTTER.
APPLICATION FILED JULY 29, 1920.
1,363,741.
Patented Dec. 28, 1920.
4 SHEETS—SHEET 2.
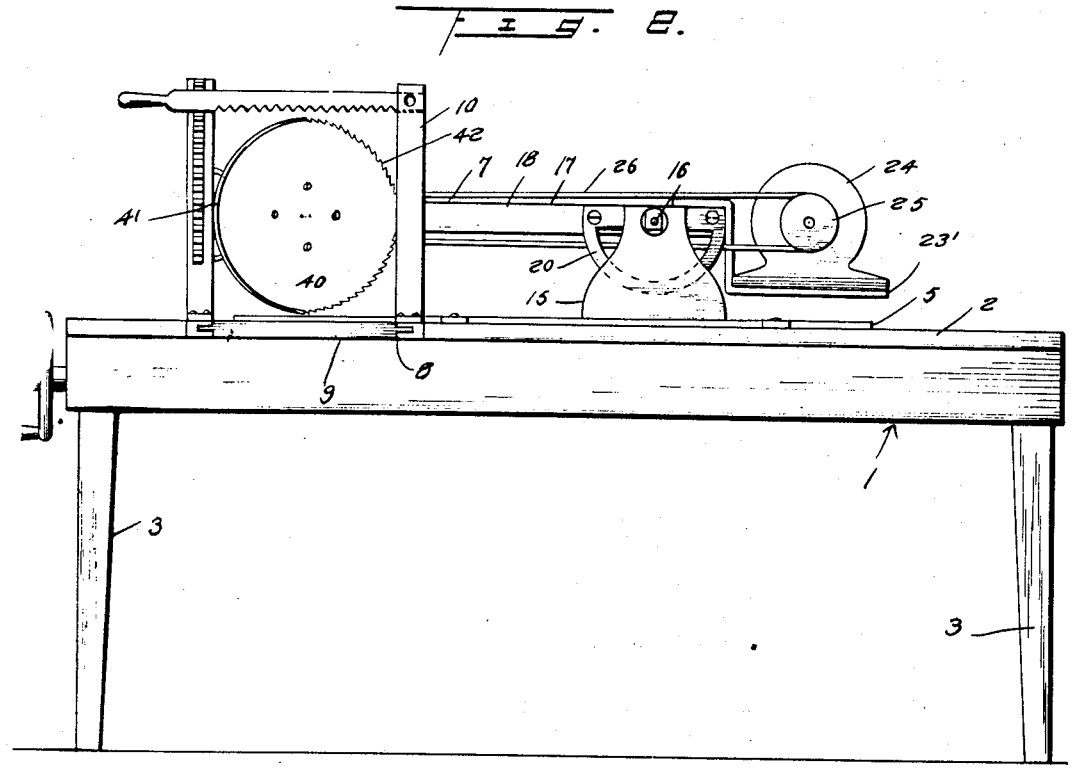
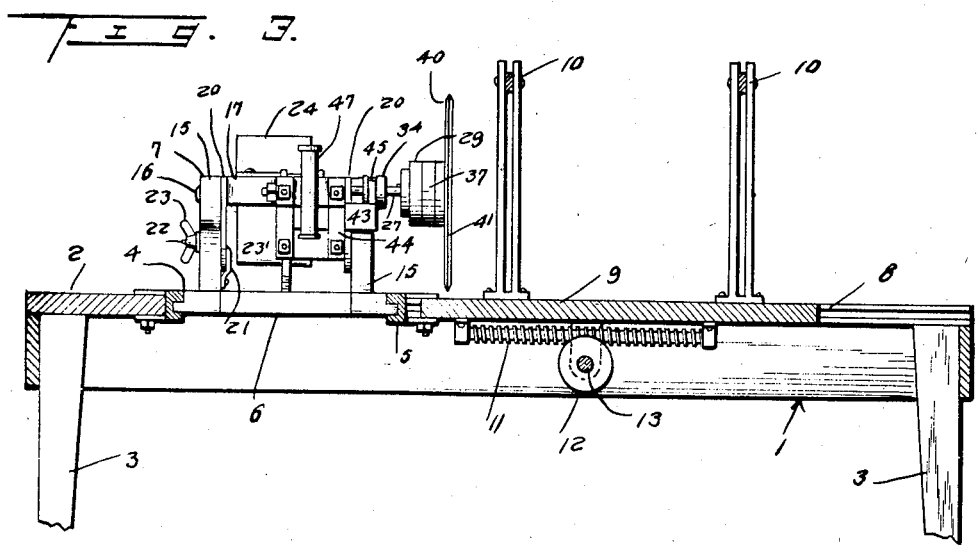
INVENTOR.
G. McElroy
BY
ATTORNEY.

G. McELROY.
MEAT CUTTER.
APPLICATION FILED JULY 29, 1920.

1,363,741.

Patented Dec. 28, 1920.

4 SHEETS—SHEET 3.

INVENTOR.
G. McElroy.
BY
ATTORNEY.

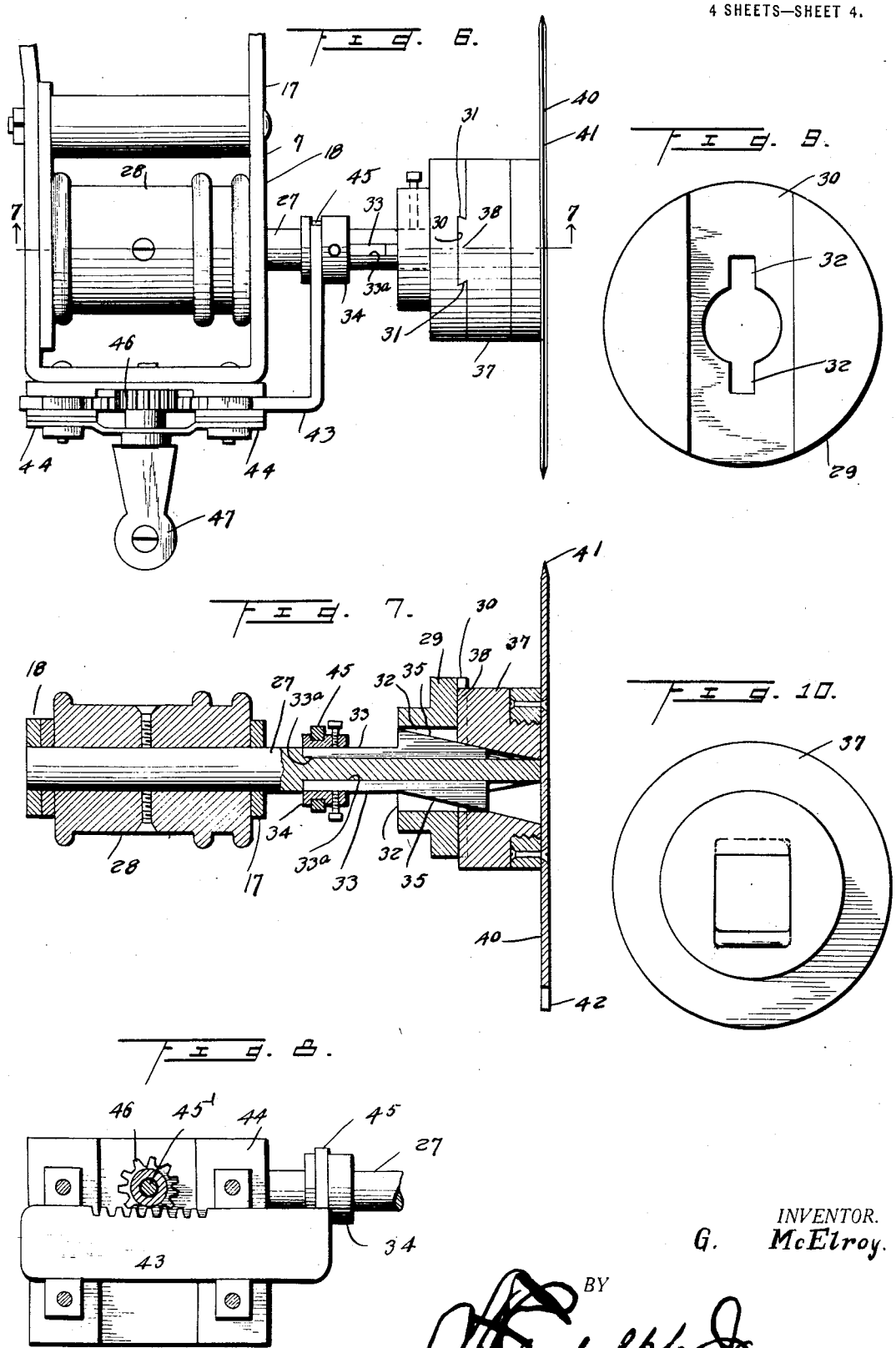

UNITED STATES PATENT OFFICE.

GEORGE McELROY, OF PLAIN CITY, UTAH.

MEAT-CUTTER.

1,363,741.  Specification of Letters Patent.  Patented Dec. 28, 1920.

Application filed July 29, 1920. Serial No. 399,710.

*To all whom it may concern:*

Be it known that I, GEORGE McELROY, a citizen of the United States, residing at Plain City, in the county of Weber and State of Utah, have invented certain new and useful Improvements in Meat-Cutters; and I do hereby declare the following to be a full, clear, and exact description of the invention, such as will enable others skilled in the art to which it appertains to make and use the same.

This invention relates to new and useful improvements in meat cutters and has for its primary object the provision of a device of the above stated character, whereby large size meats containing bones may be supported and easily and quickly cut into steaks and the like.

Another object of this invention is the provision of a rotatable cutting head having different cutting edges either one of which may be easily moved into and out of cutting position.

Another object of the invention is the provision of a meat cutter which shall include an arbor, a cutter head having a curved knife edge and a curved saw edge arranged eccentrically with respect to each other, and means for connecting the cutter head to the arbor adapted to be actuated to adjust the centers of said edges with relation to the axis of rotation of the arbor so as to arrange one edge in position for travel in a cutting path and the other edge in position for travel inwardly of the cutting path.

A further object of this invention is the provision of means whereby the position of the cutting head may be easily changed without stopping the rotation of said cutting head or withdrawing it from the meat.

A still further object of this invention is the provision of a meat cutter of the above stated character which will be simple, durable, and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 4:
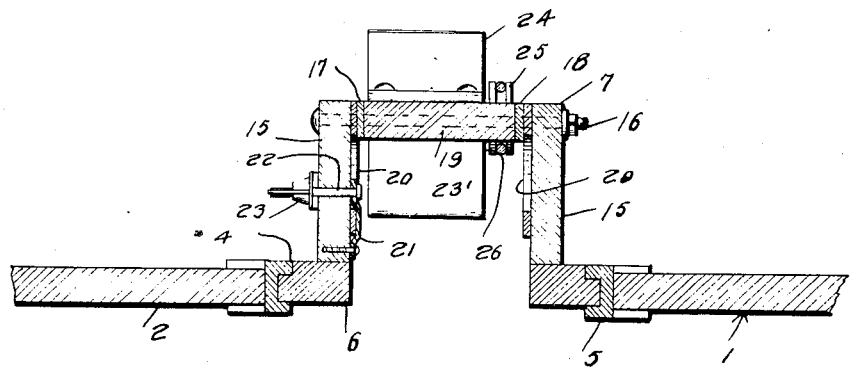
Figure 5:
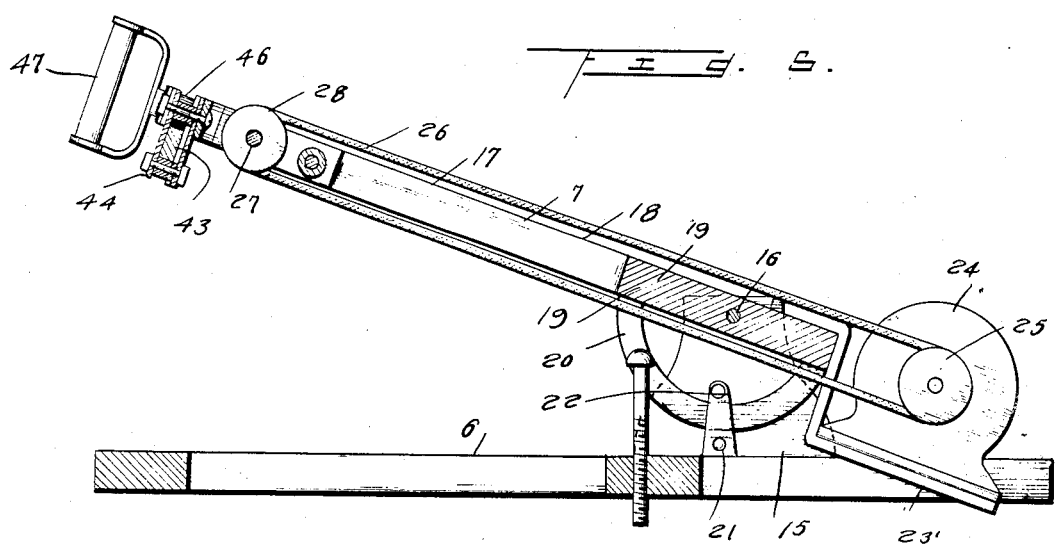
Figure 11:
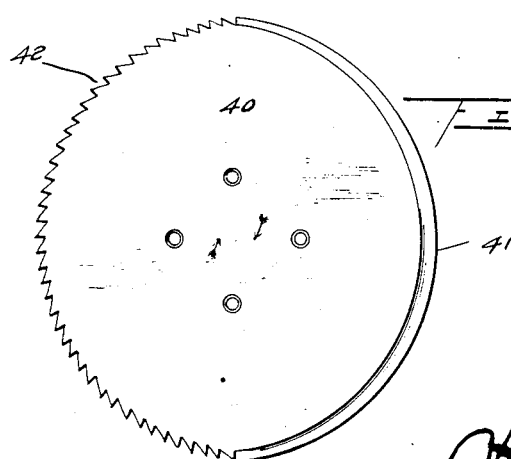

Figure 1 is a top plan view, illustrating a meat cutter constructed in accordance with my invention, Fig. 2 is a side elevation illustrating the same, Fig. 3 is a fragmentary transverse sectional view taken on line 3—3 of Fig. 1, Fig. 4 is a similar view taken on the line 4—4 of Fig. 1, Fig. 5 is a longitudinal sectional view illustrating the saw device in an elevated position, Fig. 6 is an enlarged plan view, illustrating the cutting head and its control means, Fig. 7 is a sectional view taken on line 7—7 of Fig. 6, Fig. 8 is an end view, illustrating the cutting head controlling means, Fig. 9 is a plan view illustrating one of the eccentric blocks or disks, Fig. 10 is a similar view illustrating the other eccentric block or disk, Fig. 11 is a diagram of the cutting head.

Fig. 12 is an end view, illustrating the eccentric block or disk shown in Fig. 10 applied to the arbor.

Referring in detail to the drawings, the numeral 1 indicates as an entirety a stand or support which includes a top 2 supported by legs 3 and the top 2 has a longitudinally extending slot 4 in which is secured a guide frame 5. The guide frame 5 is adapted to slidably support a base 6 of a cutting device 7. The top 2 of the stand or support has a transversely disposed slot 8 in which is slidably mounted a meat carrier and holder 9.

The meat supporting table 8 is provided with the usual meat securing clamps 10 and a worm feed element 11 meshing with a worm gear 12 secured to a shaft 13 journaled in the stand 1 and has secured to its outer end a wheel 14 for the purpose of reciprocating the meat holder or table toward and from the meat cutting device 7.

The base 6 has secured thereto upstanding supporting members 15 in which is journaled a rod or shaft 16 that extends through a knife supporting arm 17. The knife supporting arm 17 is pivotally connected to the supporting member 15 and consists of a metallic frame 18 provided with a spacing block 19 therebetween and through which the rod or shaft 16 extends. The side members of the metallic frame 18 have secured thereto segmental members 20 that lie in close proximity to the inner faces of the supporting members 15 and one of said segmental members 20 has disposed over the same a clamping plate 21 which has one end secured to one of the supporting members 15 and its other end connected to a set bolt 22 provided with a nut 23 and which bolt is carried by the last named supporting member 15 providing a construction wherein the supporting arm 17 may be held in various adjusted positions.

The block 17 has adjustably secured thereto a bracket 23' on which an electric motor 24 is secured. The electric motor 24 has a pulley 25 secured to its armature shaft over which travels an endless belt 26. An arbor 27 is journaled in the free end of the arm 17 and has secured thereto a pulley 28 over which the endless belt is trained so that said arbor will be driven by the electric motor. A block or disk 29 is detachably secured to the outer end of the arbor 27 and has formed on its outer face spaced guides 30 provided with beveled edges 31. The disk or block 29 is also provided with oppositely disposed slots 32 that communicate with the central opening thereof and receives shifting elements 33 that have their inner ends secured to a shifting collar 34 slidably mounted on the arbor 27. The shifting elements 33 are also slidably mounted in grooves 33ª formed in the arbor 29. The shifting elements 33 have oppositely disposed wedge and cam shaped ends 35 which are received in oppositely disposed slots formed in a cutter supporting block or disk 37.

The block or disk 37 has formed on its inner face a guide plate 38 which is received between the guides 30 and has its edges beveled to coöperate with the beveled edges of the guides 30 to slidably secure the blocks 29 and 37 together. A cutter head 40 is detachably secured to the outer face of the block or disk 37 and has a curved knife edge 41 and a curved saw edge 42 arranged eccentrically with respect to each other.

A rack bar 43 is slidably mounted in a bracket 44 secured to the end of the arm 17 and has secured to one end a fork 45 which engages the shifting collar 34. A shaft 45' is journaled in the bracket 44 and has secured thereto a pinion 46 that meshes with the rack bar 43 and also has secured to its outer end a handle 47 which handle may be employed for sliding the base 6 on the stand 1 and for raising and lowering the arm 17 and for operating the shifting elements 33.

In operation, a side of beef or the like is placed upon the meat supporting table 8 and secured thereto by the clamps 10 and the arm 17 is then lowered to bring the cutting head 40 into engagement with the meat. The handle 47 is adapted to be positioned either horizontally or vertically to adjust the centers of the edges 41 and 42 with relation to the axis of rotation of the arbor 27 so as to arrange one edge in position for travel in a cutting path and the other edge in position for travel inwardly of the cutting path, thereby providing means whereby the flesh may be cut by the knife edge and when reaching a bone, the saw edge then may be brought into cutting position. It is also to be noted that the position of the cutting head 40 may be changed by the handle 47 without withdrawing the head 40 from the meat or discontinuing the rotation of said head by the stopping of the motor. Only one of the edges 41 or 42 is in the cutting path at a single time.

While I have shown and described the preferred embodiment of my invention, it will be understood that minor changes in construction, combination, and arrangement of parts may be made without departing from the spirit and scope of the invention as claimed.

Having thus described my invention what I claim is:

1. A meat cutter including a rotatably mounted arbor, means for rotating the arbor, a cutting head having a curved knife edge and a curved saw edge arranged eccentrically in relation to each other, and means for connecting the head to the arbor and adapted to adjust the centers of said edges with relation to the axis of rotation of the arbor so as to arrange one edge in position for travel in a cutting path and the other edge in position for travel inwardly of the cutting path.

2. A meat cutter comprising a base, an arm pivoted to said base, means for securing said arm in adjusted position in relation to the base, a motor adjustably connected to said arm, an arbor journaled in said arm, means connecting the motor to the arbor, a cutting head having a curved knife edge and a curved saw edge, and means for connecting the head to the arbor and adapted to be actuated to adjust the centers of said edges with relation to the axis of rotation of the arbor so as to arrange one edge in position for travel in a cutting path and the other edge in position for travel inwardly of the cutting path.

3. A meat cutter comprising a base, an arm pivotally and adjustably secured to said base, an arbor journaled to said arm, means rotating said arbor, an eccentric block secured to said arbor, a second eccentric block slidably secured to the first named eccentric block, a cutting head secured to the second block and having a curved knife edge and a curved saw edge, shifting elements slidably mounted on the arbor and extending through the first block and in engagement with the second block, and means connected to the shifting elements to adjust the centers of said edges with relation to the axis of rotation of the arbor so as to arrange one edge in position for travel in a cutting path and the other edge in position for travel inwardly of the cutting path.

4. A meat cutter comprising a base, an arm pivotally and adjustably secured to said base, an arbor journaled to said arm, means rotating the arbor, a block secured to said arbor, a second block slidably connected to the first block, a cutting head detachably secured to the second block and having a curved knife edge and a curved saw edge, shifting elements slidably mounted on the arbor and extending through the first block and in arrangement with the second block, a handle journaled to said arm, and means connecting the handle to the shifting elements to adjust the centers of said edges with relation to the axis of rotation of the arbor so as to arrange one edge in position for travel in a cutting path and the other edge in position for travel inwardly of the cutting path.

5. A meat cutter including an arbor, means for rotating said arbor, a cutting element embodying a knife and saw fixed with respect to each other and mounted on said arbor, means for adjusting the cutting element on the arbor to arrange one of said cutting parts in cutting position and the other in non-cutting position.

6. A meat cutter comprising a base, an arm carried by said base, an arbor journaled to said arm, means for rotating said arbor, a cutting element embodying a knife and saw fixed with respect to each other, and means for connecting the cutting element to the arbor and adapted to be actuated to adjust the centers of the edges of said knife and saw with relation to the axis of rotation of the arbor so as to arrange one edge in position for travel in a cutting path, and the other edge in position for travel inwardly of the cutting path.

In testimony whereof I affix my signature in presence of two witnesses.

GEORGE McELROY.

Witnesses:
MORONI SKEEN,
O. A. KENNEDY.